(12) United States Patent
Uihlein et al.

(10) Patent No.: US 8,936,442 B2
(45) Date of Patent: Jan. 20, 2015

(54) METHOD FOR THE PRODUCTION OF AN INTEGRALLY BLADED ROTOR, AND ROTOR

(75) Inventors: Thomas Uihlein, Dachau (DE); Erich Steinhardt, Munich (DE)

(73) Assignee: MTU Aero Engines GmbH, Munich (DE)

( * ) Notice: Subject to any disclaimer, the term of this patent is extended or adjusted under 35 U.S.C. 154(b) by 401 days.

(21) Appl. No.: 12/998,977

(22) PCT Filed: Jan. 30, 2010

(86) PCT No.: PCT/DE2010/000100
§ 371 (c)(1),
(2), (4) Date: Jun. 21, 2011

(87) PCT Pub. No.: WO2010/094255
PCT Pub. Date: Aug. 26, 2010

(65) Prior Publication Data
US 2011/0255981 A1    Oct. 20, 2011

(30) Foreign Application Priority Data

Feb. 21, 2009 (DE) .......................... 10 2009 010 025

(51) Int. Cl.
*F01D 5/14* (2006.01)
*F04D 29/38* (2006.01)
(Continued)

(52) U.S. Cl.
CPC ......... *B23K 15/0053* (2013.01); *B23K 15/0086* (2013.01); *B23K 26/203* (2013.01); *B23K 35/3033* (2013.01); *F01D 5/34* (2013.01); *B23K 26/3213* (2013.01); *B23K 26/345* (2013.01); *B23K 35/0238* (2013.01); *B23K 2201/001* (2013.01); *F05D 2230/22* (2013.01); *F05D 2230/233* (2013.01); *F05D 2230/234* (2013.01); *F05D 2250/232* (2013.01)
USPC ................................... 416/241 R; 416/223 A

(58) Field of Classification Search
USPC .............. 416/223 R, 234, 241 R, 223 A, 248;
29/889.7, 889.71, 527.1; 228/119,
228/248.1–248.5
See application file for complete search history.

(56) References Cited

U.S. PATENT DOCUMENTS 2,778,095 A * 1/1957 Schorner .................... 29/889.21
3,003,745 A * 10/1961 Ferguson, Jr. et al. ............ 415/9
(Continued)

FOREIGN PATENT DOCUMENTS

DE  10 2004 017 769   12/2004
DE     102004006154    8/2005
(Continued)

*Primary Examiner* — Edward Look
*Assistant Examiner* — Christopher J Hargitt
(74) *Attorney, Agent, or Firm* — Davidson, Davidson & Kappel, LLC

(57) ABSTRACT

A method for manufacturing an integrally bladed rotor (10), in particular for a gas turbine, including the following method steps: preparing a rotor base member (12) having at least one first weld surface (16) and one blade (14) having a second weld surface (18); positioning the rotor base member (12) and the blade (14) in such a way that a join zone (20) is formed between the first and second weld surface (16, 18); and filling the join zone (20) with metal powder (24) and the laser welding or electron beam welding of the metal powder (24). An integrally bladed rotor (10) has a join zone (20) between the rotor base member (12) and blades (14), the join zone (20) being filled with welded metal powder (24).

17 Claims, 2 Drawing Sheets

(51) Int. Cl.
*B23K 15/00* (2006.01)
*B23K 26/20* (2014.01)
*B23K 35/30* (2006.01)
*F01D 5/34* (2006.01)
*B23K 26/32* (2014.01)
*B23K 26/34* (2014.01)
*B23K 35/02* (2006.01)

(56) References Cited

U.S. PATENT DOCUMENTS

| | | | |
|---|---|---|---|
| 4,096,615 A | 6/1978 | Cross | 29/156.8 R |
| 5,038,014 A | 8/1991 | Pratt et al. | 219/121.64 |
| 6,815,636 B2 | 11/2004 | Chung et al. | 219/121.65 |
| 7,847,212 B2 * | 12/2010 | Renz et al. | 219/121.61 |
| 2007/0119830 A1 | 5/2007 | Meier | |
| 2008/0244905 A1 * | 10/2008 | Meier | 29/889.1 |

FOREIGN PATENT DOCUMENTS

| | | |
|---|---|---|
| DE | 10 2004 032 975 A1 | 2/2006 |
| DE | 10 2004 043 746 | 3/2006 |
| DE | 10 2005 025 348 A1 | 12/2006 |
| EP | 2047938 | 4/2005 |
| EP | 1 541 723 A2 | 6/2005 |
| EP | 2000631 | 12/2008 |
| JP | 62107866 | 5/1987 |
| WO | WO 2005/075140 | 8/2005 |

* cited by examiner

METHOD FOR THE PRODUCTION OF AN INTEGRALLY BLADED ROTOR, AND ROTOR

The present invention relates to a method for manufacturing an integrally bladed rotor, in particular for a gas turbine, as well as to the rotor itself.

Gas turbine rotors having integral blading are known as blisks or blings depending on whether a rotor or rotor carrier (referred to in the following as rotor base member) having a disk-shaped or an annular cross section is provided. Blisk is the abbreviated form of 'bladed disk,' and bling is the abbreviated form of 'bladed ring.'

BACKGROUND

From the related art, it is known to manufacture gas turbine rotors having integral blading by milling the same from a solid blank. This is naturally a very complex and expensive process, so that this method is used only for relatively small gas turbine rotors.

Another method that is used for large rotors is friction welding. In this context, rotor base members and the blades are manufactured separately and subsequently friction-welded to one another, in particular by linear friction welding. One advantage of using welding processes in manufacturing is that the rotor base member and turbine blades can be manufactured from different materials that are adaptable to the different requirements of these sections of the rotor. In the joined state, it is difficult to align the blades to the rotor base member, particularly during friction welding when one of the two parts must be moved in relation to the other. In friction welding processes, a weld bead generally forms that must be removed following the welding operation by further machining of the rotor, for example by milling.

The blades of the rotor are made of monocrystalline or other materials, for example, which do not allow a fusion welding process. From the related art, it is known to first join an adapter element to the blade root which is then welded, in turn, to the rotor base member.

SUMMARY OF THE INVENTION

It is an object of the present invention to provide a method for manufacturing an integrally bladed rotor which will make it possible to avoid the negative effects on the material properties caused by join processes and in accordance with which the rotor will not require any costly secondary machining following the join process. It is also intended to provide a rotor that will be able to be manufactured in the simplest possible manner.

The method of the present invention provides the following steps. In a first step, a rotor base member having at least one first weld surface and a blade having a second weld surface are prepared. In the following step, the rotor base member and the blade are positioned in such a way that a join zone is formed between a first and second weld surface. In a subsequent step, the join zone is filled with metal powder, and the metal powder is laser welded or electron beam welded. Since there is no need in this method to move the blade and the rotor base member relative to one another, the blades may be positioned very precisely in relation to the rotor base member. By filling the join zone using a generative method, such as laser deposition welding, for example, one is able to economize on expensive material, which in conventional methods requires cutting machining, for example the milling of weld beads.

In accordance with the preferred specific embodiment, a plurality of blades and a plurality of associated second weld surfaces are, of course, provided.

The join zone preferably has a conically tapered configuration. This makes possible a simple geometry of the weld surfaces and an ease of access for metal powder and lasers, respectively electron beams.

The method is able to be implemented in that the join zone is filled with metal powder in layers, each layer being welded. In this manner, deep join zones may also be filled and welded.

The layers may also essentially extend in the rotor plane. This make it possible for the join zone to have a simple geometry and for the rotational symmetry of the rotor to be utilized.

The energy input during welding is preferably selected in such a way that no macroscopic fusion takes place at the second weld surface of the blade. This prevents the join process from negatively influencing the material properties of the blade.

Another variant of the method provides for leaving open a relief opening when filling the join zone. In this manner, a relief opening is formed already during the join process and does not need to be produced later by drilling or milling, thereby economizing on material and costs.

To form the relief opening, an overflow pipe may be embedded in the join zone. On the one hand, this makes possible a precise positioning of the relief opening and, on the other hand, limits the depth of the join zone.

When filling the join zone, a scraper rake or brushes or rollers (depending on the geometry) is/are preferably used. The metal powder may thus be distributed in a simple manner in layers of the same height.

The present invention also relates to an integrally bladed rotor having a join zone between the rotor base member and blades, the join zone being filled with welded metal powder.

The join zone preferably has layers which essentially extend, in particular, in the rotor plane.

BRIEF DESCRIPTION OF THE DRAWINGS

Other features and advantages of the present invention are derived from the following description and from the following drawings, to which reference is made. In the drawings, the figures show.

DETAILED DESCRIPTION

Figure 1:
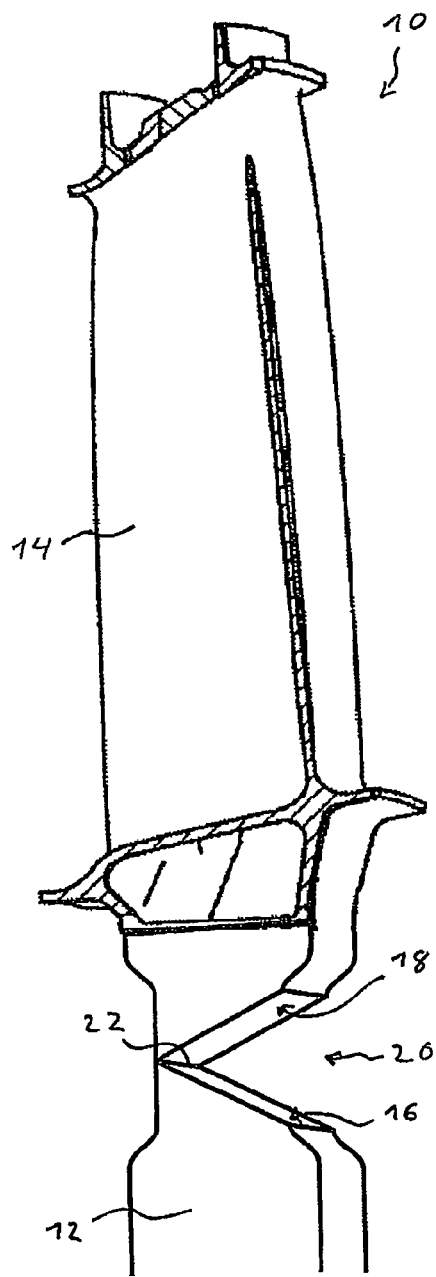
FIG. 1 a rotor base member and a blade of a rotor in accordance with a first specific embodiment of the present invention prior to the join process.

FIG. 1 shows a section through a first specific embodiment of an integrally bladed rotor 10 having a rotor base member 12 and a blade 14 of numerous blades prior to the join process, whereby rotor base member 12 and blade 14 are integrally joined to one another. Rotor base member 12 has a conically tapered first weld surface 16. Blade 14 has a conically tapered second weld surface 18 in the area of the blade root.

Rotor base member 12 and blade 14 are positioned relative to one another in such a way that first weld surface 16 and second weld surface 18 oppose one another, a join zone 20 being formed between weld surfaces 16, 18.

Rotor base member 12 and blade 14 contact one another along a line 22 at the left edge of weld surfaces 16, 18. Thus, at the left end face of rotor 10, there is a direct transition from rotor base member 12 to blade 14, while, at the right end face of rotor 10, join zone 20 resides between rotor base member 12 and blade 14.

In the specific embodiment shown in FIG. 1, the left end face of rotor 10 forms the front side of rotor 10, viewed in the direction of flow. It is naturally also possible that line 22 where rotor base member 12 and blade contact 14 one another resides on the right side of weld surfaces 16, 18, and that the rear end face of rotor 10 features the direct transition between rotor base member 12 and blade 14. Moreover, it is also possible that line 22 essentially resides in the middle of weld surfaces 16, 18 and that weld surfaces 16, 18 are conically tapered in both directions, a left and a right join zone being formed.

Figure 2:
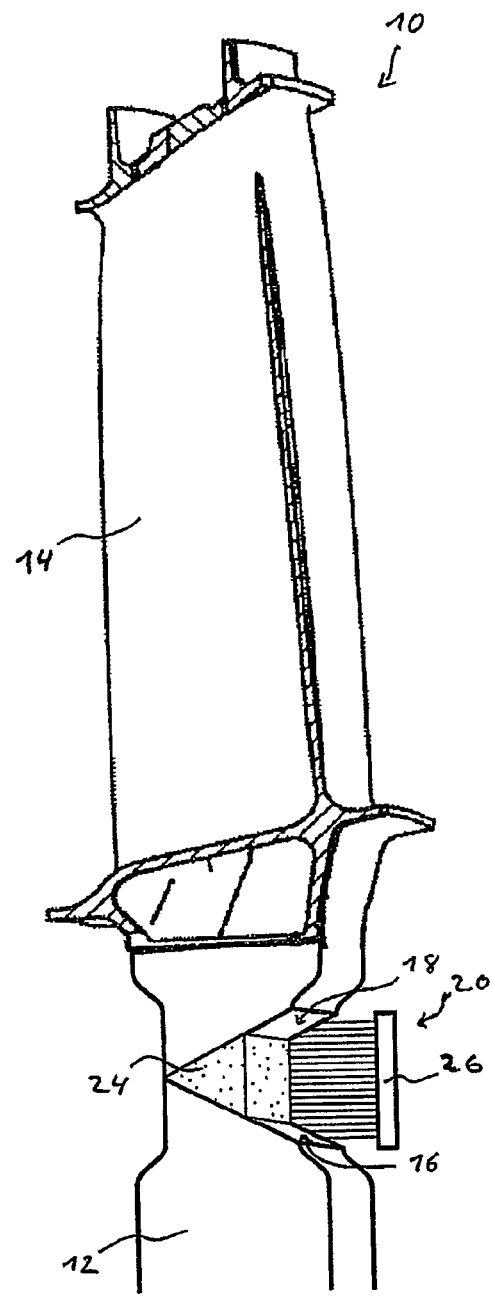
FIG. 2 the rotor base member and the blade in accordance with FIG. 1 during the join process.

FIG. 2 shows rotor 10 in accordance with FIG. 1, one half of join zone 20 being filled with metal powder 24. A schematically illustrated scraper rake 26 is used for uniformly filling join zone 20. Scraper rake 26 may rotate in conformance with the geometry of rotor 10 and may thus sweep over the entire rotationally symmetrical join zone 20.

Figures 3, 4:
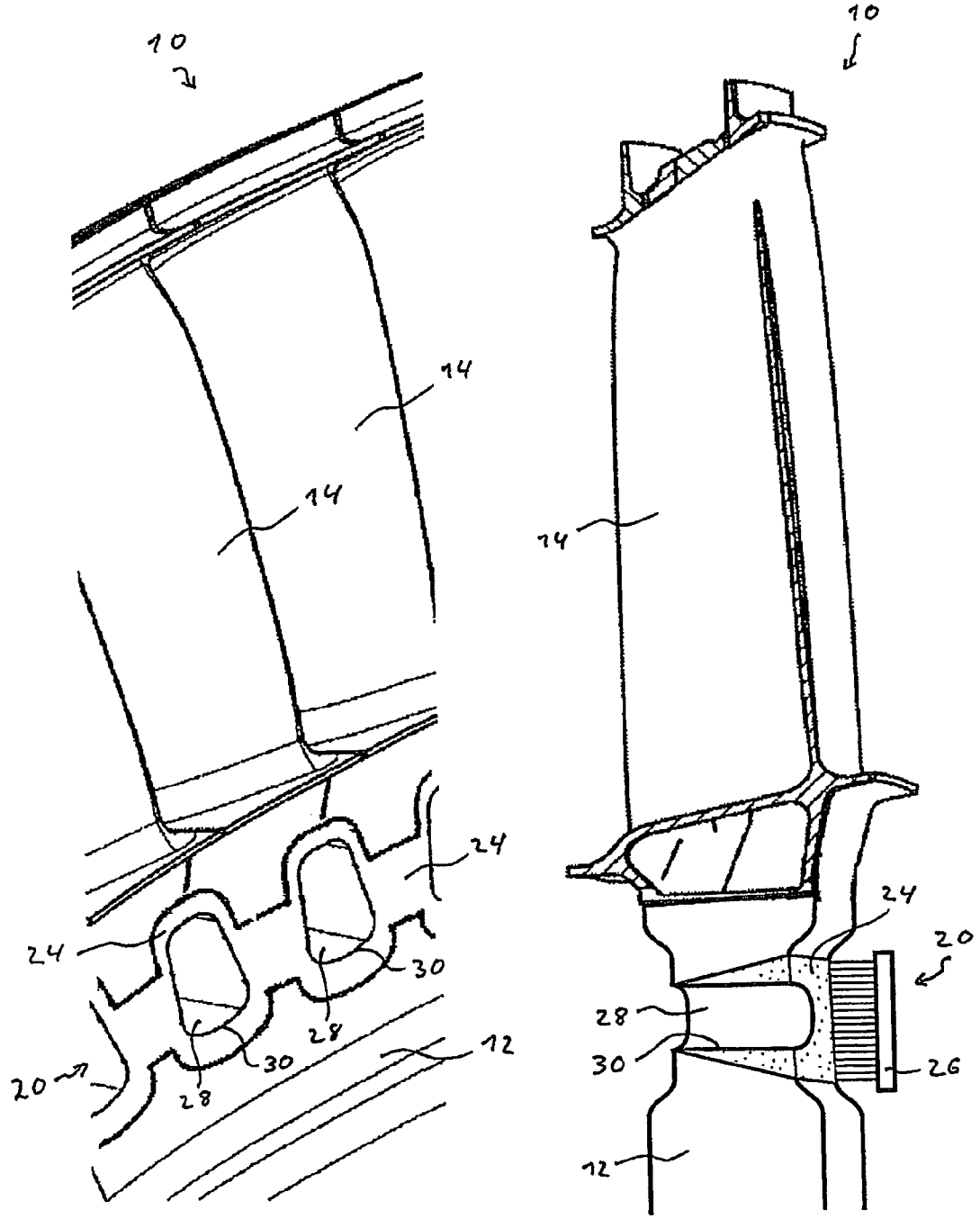
FIG. 3 a perspective view of a rotor in accordance with a second specific embodiment of the present invention.
FIG. 4 a section through the rotor in accordance with FIG. 3.

FIG. 3 shows a perspective view of a second specific embodiment of integrally bladed rotor 10. In the area of adjacent blades 14, join zone 20 has widened portions in each of which, a relief opening 28 is provided. Relief openings 28 are used, on the one hand, to relieve thermal and mechanical stresses in the edge area of rotor base member 12 and, on the other hand, to reduce weight and economize on material. Overflow pipes 30 are embedded in join zone 20 in metal powder 24 to form relief openings 28.

FIG. 4 shows a section through rotor 10 (shown in FIG. 3) at the level of a relief opening 28. With the exception of relief opening 28, join zone 20 is essentially completely filled with metal powder 24.

Rotor base member 12 is preferably a forged polycrystalline of nickel-based alloys.

Blades 14 may be manufactured from nickel-based single crystals, directionally solidified materials or polycrystalline materials, the materials being selected in dependence upon on the application requirements of the rotor.

The method for manufacturing integrally bladed rotor 10 is described in the following.

In a first method step, rotor base member 12 having a first weld surface 16 and at least one blade 14 having a second weld surface 18 are prepared. First weld surface 16, to which all blades 14 are welded, extends, in particular, rotationally symmetrically about rotor base member 12. It is also possible that a plurality of separate first weld surfaces 16 are provided, the number of first weld surfaces 16 on rotor base member 12 corresponding, for example, to the number of blades 14 to be added.

Either one single blade 14 or a plurality of blades 14, in particular all blades 14, may be simultaneously welded to rotor base member 12. Blade 14 and rotor base member 12 are positioned relative to one another in such a way that a join zone 20 is formed between first and second weld surface 16, 18. In the first specific embodiment shown in FIG. 1, join zone 20 extends rotationally symmetrically about entire rotor base member 12.

In the next method step, a thin layer of metal powder 24 is filled into join zone 20 and distributed with the aid of scraper rake 26 in a homogeneous thickness over entire join zone 20. Metal powder 24 is then laser welded or electron beam welded, first weld surface 16 and second weld surface 18 being joined by welded metal powder 24.

When welding only a thin layer of metal powder 24 by laser welding or electron beam welding, the energy input may be selected to be minimal to ensure that no macroscopic fusion takes place at second weld surface 18 of blade 14 and that the material properties of blade 14 are retained.

Following the first welding operation, a second layer of metal powder 24 is introduced into join zone 20, and welding is performed again. This process is repeated until entire join zone 20 is filled with metal powder 24.

In the illustrated specific embodiment, first and second weld surface 16, 18 are conically tapered surfaces, thereby achieving an ease of access for metal powder 24 and for the laser, respectively electron beam. However, weld surfaces 16, 18 may also have other geometries.

In FIG. 2, rotor 10 is shown during the join process, approximately one half of join zone 20 being filled with metal powder 24. As is readily discernible in this representation, metal powder layers essentially extend in the rotor plane (radial plane).

In the second specific embodiment of rotor 10 shown in FIG. 3 and FIG. 4, the manufacturing method essentially proceeds analogously to the first specific embodiment. In this case, join zone 20 does not have an axially symmetrical form, but rather has widened portions in the area of adjacent blades 14, in which overflow pipes 30 are installed to form relief openings 28 at the beginning of the process when rotor base member 12 and blades 14 are positioned. No metal powder 24 is welded inside of overflow pipes 30, thereby leaving open relief opening 28 when filling join zone 20.

Overflow pipes 30 provide an overflow for excess metal powder 24. If join zone 20 is nearly filled, as shown in FIG. 4, it is then possible for excess metal powder 24 to be filled into join zone 20. This excess metal powder 24 is pushed by scraper rake 26 into relief opening 28 formed by overflow pipe 30, falls through relief opening 28, and may be collected on the other side and reused.

The welding process is, therefore, carried out in the horizontal state of the rotor.

When such a generative join process is used, rotor 10 substantially corresponds to its desired final contour following the join process, making it possible to save subsequent machining steps.

The invention claimed is:

1. A method for manufacturing an integrally bladed rotor having a rotor base member and a plurality of blades comprising the following method steps:

preparing the rotor base member having at least one first weld surface and one blade of the plurality of blades having a second weld surface, the rotor base having an axial direction in a direction of flow, a radial direction and a circumferential direction;

positioning the rotor base member and the blade after the preparing step so that end faces of the rotor in the axial direction delimit a join zone formed between the first and second weld surfaces;

filling the join zone with metal powder; and laser welding or electron beam welding the metal powder in the join zone, wherein the join zone is filled with metal powder in layers, each layer being welded and running radially and circumferentially and stacked axially with respect to the rotor.

2. The method as recited in claim 1 wherein the join zone is conically tapered starting at one of the end faces.

3. The method as recited in claim 1 wherein an energy input during welding is selected in such a way that no macroscopic fusion takes place at the second weld surface of the blade.

4. The method as recited in claim 1 wherein a relief opening is left open when the join zone is filled.

5. The method as recited in claim 4 wherein, to form the relief opening, an overflow pipe is embedded in the join zone.

6. The method as recited in claim 1 wherein a scraper rake, a scraper brush, or a roller is used when filling the join zone.

7. The method as recited in claim 1 wherein the rotor is a gas turbine.

8. An integrally bladed rotor comprising:
a rotor base member having an axial direction in a direction of flow;
blades; and
a join zone between the rotor base member and the blades, the join zone being filled with welded metal powder, the join zone having layer running radially with respect to the rotor and extending conically starting at one axial face of the rotor and tapering in the axial direction.

9. An integrally bladed gas turbine comprising: the rotor as recited in claim 8.

10. The method as recited in claim 1 wherein during the positioning step the rotor base member and the blade directly transition into each other at one of the end faces.

11. The method as recited in claim 1 wherein during the positioning step the rotor base member and the blade contact each other along a line.

12. The method as recited in claim 1 wherein the plurality of blades are simultaneously welded to the rotor base member.

13. The method as recited in claim 1 wherein an overflow pipe is positioned between the blade and the rotor base member.

14. A method for connecting a rotor base member to a blade to form an integrally bladed rotor comprising the following method steps:
preparing the rotor base member having at least one first weld surface and a blade having a second weld surface, the rotor base having an axial direction in a direction of flow, a radial direction and a circumferential direction;
positioning the rotor base member and the blade so that end faces of the rotor delimit a join zone formed between the first and second weld surfaces, the first and second weld surfaces not contacting each other or contacting each other only along a line;
filling the join zone with metal powder; and
laser welding or electron beam welding the metal powder in the join zone to form radially and circumferentially running layers stacked axially.

15. A method for connecting a rotor base member to at least one blade to form an integrally bladed rotor comprising the following method steps:
preparing the rotor base member having at least one first weld surface and the blade having a second weld surface, the rotor base having an axial direction in a direction of flow, a radial direction and a circumferential direction;
positioning the rotor base member and the blade after the preparing step so that end faces of the rotor delimit a join zone formed between the first and second weld surfaces;
filling the join zone with metal powder; and
laser welding or electron beam welding the metal powder in the join zone, wherein the join zone is filled with metal powder in layers, each layer being welded and running radially and circumferentially and stacked axially with respect to the rotor.

16. The method as recited in claim 15 further comprising preparing a second blade and welding the second blade to the rotor base member.

17. An integrally bladed rotor comprising:
a rotor base member having an axial direction in a direction of flow;
blades; and
a join zone between the rotor base member and at least one of the blades, the join zone being filled with welded metal powder, the join zone having layer running radially with respect to the rotor and extending conically starting at one axial face of the rotor and tapering in the axial direction.

* * * * *